United States Patent [19]

Schrenk

[11] Patent Number: 4,819,202
[45] Date of Patent: Apr. 4, 1989

[54] RELEASE PROCESS FOR AN ACCESS-CONTROLLED USER MEMORY AND APPARATUS FOR CARRYING OUT THE PROCESS

[75] Inventor: Hartmut Schrenk, Haar, Fed. Rep. of Germany

[73] Assignee: Siemens Aktiengesellschaft, Berlin and Munich, Fed. Rep. of Germany

[21] Appl. No.: 882,221

[22] Filed: Jul. 7, 1986

[30] Foreign Application Priority Data

Jul. 12, 1985 [DE] Fed. Rep. of Germany ....... 3525017

[51] Int. Cl.⁴ ..................... G06F 11/34; G11C 11/40; G06K 5/00
[52] U.S. Cl. .................................. 364/900; 365/218; 235/380; 235/487
[58] Field of Search ... 364/200 MS File, 900 MS File; 235/380, 488, 492; 365/218, 230

[56] References Cited

U.S. PATENT DOCUMENTS

| 4,092,524 | 5/1978 | Moreno . | |
|---|---|---|---|
| 4,211,919 | 7/1980 | Ugon | 235/488 |
| 4,295,041 | 10/1981 | Ugon | 235/488 |
| 4,394,654 | 7/1983 | Hofmann-Cerfontaine | 235/380 |
| 4,408,119 | 10/1983 | Decavele . | |
| 4,439,670 | 3/1984 | Basset et al. . | |
| 4,484,067 | 11/1984 | Obrecht | 235/380 |
| 4,572,946 | 2/1986 | Schrenk | 235/492 |
| 4,648,076 | 3/1987 | Schrenk | 235/380 |
| 4,680,736 | 7/1987 | Schrenk | 365/218 |
| 4,712,177 | 12/1987 | Schrenk | 235/380 |
| 4,746,788 | 5/1988 | Kawana | 235/492 |
| 4,749,982 | 6/1988 | Ritura et al. | 235/380 |

FOREIGN PATENT DOCUMENTS

| 0044039 | 1/1982 | European Pat. Off. . |
| 0123177 | 10/1984 | European Pat. Off. . |
| 3315047 | 10/1984 | Fed. Rep. of Germany . |
| 2311360 | 12/1976 | France . |
| 2471000 | 6/1981 | France . |
| 2503423 | 10/1982 | France . |

Primary Examiner—Gareth D. Shaw
Assistant Examiner—Viet Q. Nguyen
Attorney, Agent, or Firm—Herbert L. Lerner; Laurence A. Greenberg

[57] ABSTRACT

A process for carrying out a release operation for a user memory includes releasing a user function in dependence on a preceding data comparison of externally entered data with reference data stored in a code memory, continuously changing the content of a control memory ahead of every release, and monitoring the change through a comparison of the initial control memory content with the changed control memory content and apparatus for carrying out the method.

2 Claims, 2 Drawing Sheets

RELEASE PROCESS FOR AN ACCESS-CONTROLLED USER MEMORY AND APPARATUS FOR CARRYING OUT THE PROCESS

BACKGROUND OF THE INVENTION AND PRIOR ART

The invention relates to a process for carrying out a release (i.e. a "validation") operation for a chip card with a user memory, in which the release (i.e. "validation") of a user function is made dependent on a preceding data comparison between externally entered data and reference data deposited in a code memory. The invention also relates to an apparatus for carrying out the process.

As is well known, integrated circuits with a non-volatile memory of the EPROM or E$^2$PROM type are placed on chip cards. In order to protect against abuse of the chip cards, they frequently contain a security logic which makes certain user functions such as readout, write, clear or comparison of the memory content dependent on the use of an internal chip data comparison between reference data which are deposited in a non-volatile manner in the memory and secret code data which must be entered by a user at a terminal. It is desired in many cases to make each use of this secret code recognizable for safety reasons so as to retain control over the memory access even in the case of a disclosure or misuse of the secret code. It is therefore possible to recognize unauthorized use and to limit the number of unauthorized attempts.

German Published, Non-Prosecuted Application DE-OS No. 33 15 047 discloses such an integrated circuit in which the clearing of an E$^2$PROM memory area remains in a non-volatile manner and is always recognizable in a counter with registers in a non-volatile manner.

Although the security for a chip card is considerably increased by these known measures, nevertheless not all abuses of the chip card can be prevented.

It is accordingly an object of the invention to provide a release process for an access-controlled user memory and for carrying out the process, which overcomes the hereinaforementioned disadvantages of the heretofore-known devices of this general type and to further improve the application of an integrated circuit of the type mentioned above.

SUMMARY OF THE INVENTION

With the foregoing and other objects in view there is provided, in accordance with the invention, a process for carrying out a release (i.e. "validation") operation for a user memory, which comprises releasing (i.e. "validating") a user operation in dependence on a preceding data comparison of externally entered data with reference data stored in a code memory, continuously changing the content of a control memory ahead of each release (i.e. validation), and monitoring the change through a comparison of the initial control memory content with the changed control memory content.

In accordance with another mode of the invention, there is provided a method which comprises:

(a) comparing the externally entered data with reference data stored in the code memory and interim memories for storing the comparison result;

(b) checking whether or not the content of the control memory is unchanged at least at one storage location; and, as applicable, (c) changing the memory location in question;

(d) checking whether or not the memory location was changed; and (e) generating a release signal, if all comparisons and checks had a positive outcome.

In accordance with an additional mode of the invention, there is provided a method which comprises generating a further release signal for releasing a clearing operation for the control memory in a further release procedure, and carrying out the further release procedure with the process steps mentioned above using further reference data.

In order to carry out the method, there is provided an apparatus for carrying out a release operation for a user memory, comprising a code memory for storing reference data; a comparator having an input connected to the code memory for receiving the reference data, an input for receiving externally entered data and an output; a first logical gate having an input connected to the output of the comparator, an input receiving a respective code memory address and an output; a control memory having an output; a second logical gate having an input connected to the output of the control memory, an input receiving a corresponding address and an output; a first interim memory having in input connected to the output of the first logical gate and an output; a second interim memory having an input connected to the output of the second gate member and an output; and a third logical gate having inputs respectively connected to the outputs of the first and second interim memories and the output of the control memory.

In accordance with a concomitant feature of the invention, the logical gate are NOR gates, the first interim memory is a code flip-flop, and the second interim memory is a bit flip-flop.

The invention is based on the use of a control unit which is internal to the chip and which registers every application of a secret code, for the purpose of reading out, writing or clearing, in a non-volatile manner in part of the memory. This registration can take place in such a manner that either every data comparison, i.e. including possibly aborted attempts, is registered or that only every data comparison with a positive outcome is retained.

In the simplest case, the control unit is formed of a memory area in which a data comparison after writing an individual bit can be controlled. However, any other non-volatile storage mode with a counting function, determined internally to the chip, can be used.

If it is an object of the invention to ensure that the use of the code should not remain undetected in any case, therefore it must not be possible under any circumstances to erase the non-volatile control counter memory. On the other hand, however, it may be desirable in some cases to clear a completely written control area again so that, for instance, the chip card can be re-used. In this case, the clearing of the control memory can again be made dependent on the application of a second secret code which must be kept secure and secret as the system code in any case. For such an application, two apparatus according to the invention may be connected in series in a chip.

Other features which are considered as characteristic for the invention are set forth in the appended claims.

Although the invention is illustrated and described herein as embodied in a release process for an access-controlled user memory and an apparatus for carrying out the process, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

DESCRIPTION OF THE PREFERRED EMBODIMENTS

Figure 1:
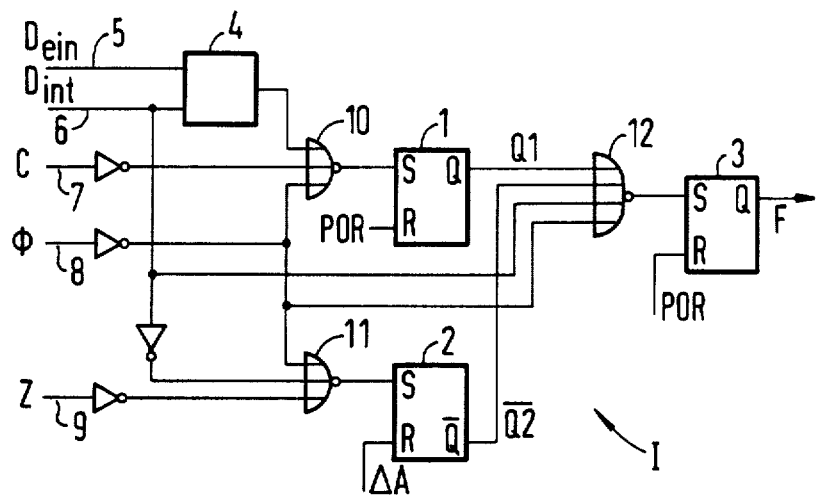
FIG. 1 is a schematic circuit diagram of a device for generating a release signal.

Referring now to the figures of the drawings in detail and first, particularly, to FIG. 1 thereof, there is seen a device I including a code flip-flop 1, a bit flip-flop 2 and a release flip-flop 3 all of the RS type, as well as a comparator logic 4. The illustrated embodiment is constructed in such a way that a bit-by-bit data comparison takes place between externally entered data and internally stored comparison data.

Furthermore, a control memory receiving the control result is provided in the form of a counter, in which a predetermined number of storage cells are changed bit by bit from the logical 1 to the logical 0 state. A logical 1 state means that the counter bit in question is free or cleared, while a so-called logical 0 state indicates that the counter bit is used up or written full.

Externally entered data $D_{ein}$ which are entered by a user through a terminal, are present on a data line 5. The data $D_{ein}$ are compared in the comparator logic 4 with internally stored data $D_{int}$ present on a line 6. As will be described below, the content of the counter is also alternatively present on the line 6. An input line 7 is addressed by a code-addressing signal C which is a logical 1 in the event of a valid code address. A line 8 is provided for issuing a clock signal $\phi$ for synchronization derived by a process control, which determines the valid evaluation times in the logical 1 state. A control signal Z on a line 9 assumes a logical 1 state if the address of the control memory or counter range is set.

The purpose of the device I is to generate a release signal F on the output side only if a code word entered on line 5 agrees with the stored reference word on line 6 bit by bit, if the control memory which acts as a counter is addressed and is registered over the line 9, if the counter has not yet reached its final state initially, and finally, if a registration process has taken place.

In order to achieve this logical interconnection, the output of the comparator 4 and the line 7 are connected through a first NOR gate 10 to a setting input S of the code flip-flop 1. The line 6 is furthermore connected through an inverter, together with the line 9 to a second NOR gate 11 which in turn is connected to a setting input S of the bit flip-flop 2. The line 6 is additionally combined, together with an output Q of the code flip-flop 1 and a shunt output $\overline{Q}$ of the flip-flop 2 through a third NOR gate 12 to a setting input S of the release flip-flop 3. For the purpose of synchronization, line 8 is connected to all three NOR gates 10, 11, 12.

The code flip-flop 1 registers operating cases, in which the externally entered data deviate from the reference data and/or in which a data comparison is carried out under an address other than a code memory address. The code flip-flop 1 is initially reset by a signal POR (power on reset), releasing the setting input S of the release flip-flop 3 through the third NOR gate 12.

The setting of the code flip-flop 1 depends on the output signal of the comparator 4 and the code address signal C. If the data present at the input of comparator 4 are equal, its output is at logical 1 and in the event of an inequality, it is at logical 0. A valid code memory address is indicated by a logical 1 on the line 7.

The code flip-flop 1 is therefore set if an inequality of the compared code data can be determined while the code address is present in the evaluation period. In this case, the NOR gate 12 is blocked, which means that the release flip-flop 3 cannot be set.

The bit flip-flop 2 registers a free, non-written-on storage location in the control memory. The bit flip-flop 2 is reset by a signal $\Delta$ A upon every change of address and when the signal POR occurs. On the other hand, the bit flip-flop 2 is set through an inverter if the internal data $D_{int}$ set on the line 6 are recognized as a logical 1 and if the control memory is simultaneously addressed (control signal Z=logical 1). In this case, the input of the NOR gate 11 is free. The bit flip-flop 2 is therefore set on the condition that a still unwritten bit in the control memory is recognized.

The release flip-flop 3 records the fact that the code data comparison terminated with an agreement as well as the fact that a free bit in the control memory was written and thereby devaluated. The release flip-flop 3 is reset and blocked by the signal POR, such as when the supply voltage is switched on. The release signal F then blocks any operation regarding a user area by a logical 0 level, as will be explained with the help of FIG. 2. The release flip-flop 3 is set if an output Q1 from the output Q of the code flip-flop 1 is at a logical 0 and if an output $\overline{Q2}$ from the output $\overline{Q}$ of the bit flip-flop 2 is likewise at logical 0, i.e. if a free bit was originally present in the control memory and if the line 6 is at a logical 0, which means that a free bit had been written in the control memory. If one of these conditions is not met or the set memory address was changed prior to writing on the control memory, the release flip-flop 3 cannot be set.

Figure 2:
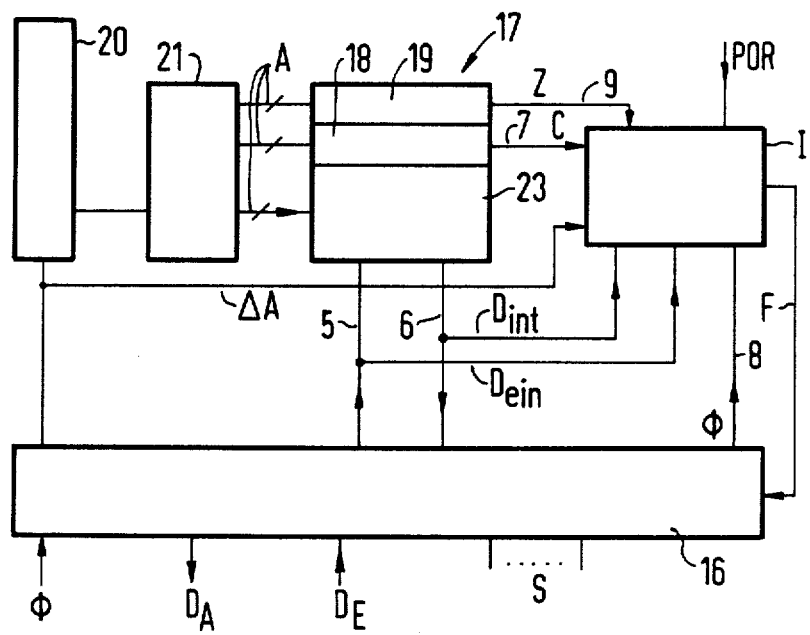
FIG. 2 is a block circuit diagram of an apparatus into which the device according to FIG. 1 is functionally integrated.

In FIG. 2, the device I of FIG. 1 is shown within a functional block diagram, which also includes a timing and process control 16, an address counter 20, an address decoder 21 and a non-volatile erasable memory 17. The timing and process control 16 may be a microprocessor, for instance. It is best to use an E$^2$PROM matrix for the memory.

The timing and process control 16 is acted upon in the conventional manner by a system clock frequency $\phi$ and by external data $D_E$. Data $D_A$ can be taken off to the outside. Control information S is exchanged through several lines. The internal connection to the address counter 20, address decoder 21 and memory 17 are likewise based on conventional interconnections in the construction of a micro-computer.

The memory 17 is divided into a code area 18 for receiving the reference data, a counter area 19 for the continuous acceptance of counter bits and an access-controlled user area 23. Addressing takes place through the address decoder 21, through which addresses A are connected to storage locations by means of a multiplicity of address lines. However, as long as a release procedure has not been completed successfully, access for writing, reading, clearing or comparing of the data stored in the user area 23 is not possible.

The control signal Z on the line 9 is derived from the address lines of the counter area 19 and the code addressing signal C on the line 7 is derived from the address lines of the code area 18. This can take place directly or through a non-illustrated decoder. It is important to ensure that the corresponding line is activated in every addressing of the area in question.

Figure 3:
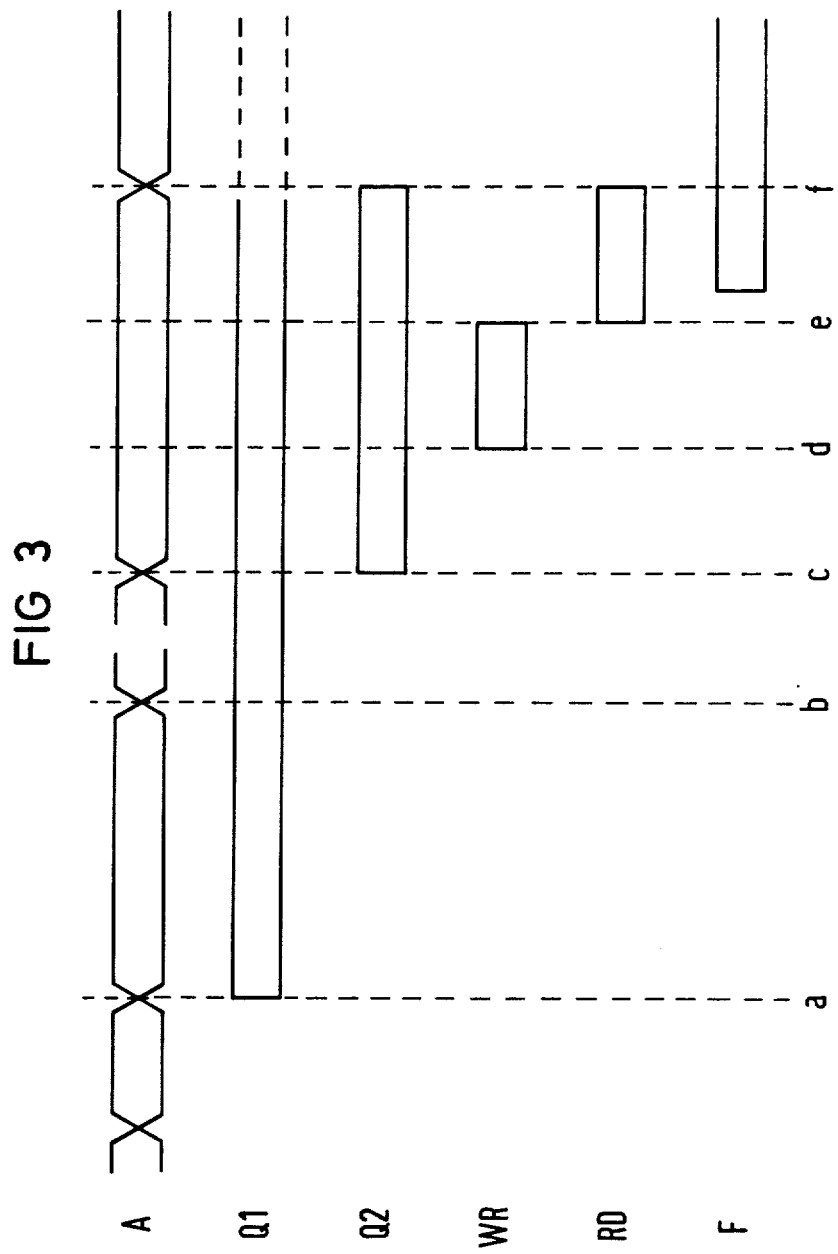
FIG. 3 is a graph of the signal and timing waveform of essential signals and the operation of the apparatus according to FIGS. 1 and 2.

If the memory address is changed, the signal $\Delta A$ is read out to the apparatus I. In the illustrated embodiment, the signal $\Delta A$ is derived from the address counter 20. The procedure and the operation of the apparatus will be explained further with the aid of the timing diagram illustrated schematically in FIG. 3, in conjunction with FIGS. 1 and 2. In the top line of the diagram, the waveform of the addresses A at the input of the counting and the code area 19, 18 is plotted. Below the top line are the signals Q1, $\overline{Q2}$ at the outputs Q of the code flip-flop 1 and the bit flip-flop 2 as well as the release signal F at the output Q of the release flip-flop 3. A write and two internal read operations WR, RD of the timing and process control 16, are additionally shown schematically.

At the start of the operation, all flip-flops are reset. If the signals of the memory address A are settled (a) and the code area 18 is addressed, the code flip-flop 1 remains reset. If not, the code area 18 is addressed, the code flip-flop 1 is set (broken line signal waveform). The code area addreses are applied under the control of the process control 16, as many times as is necessary for the bit by bit comparison of the externally entered data $D_{ein}$ with the reference data. If the data comparison is positive, the code flip-flop continues to be reset. If the result is negative, it is set (dot-dash signal waveform) (b).

Subsequently, the address of the counting area 19 is applied and the counting range 19 is read. If a free counter bit is recognized in the process, the counting flip-flop 2 is set. In every other case, i.e. if the predetermined number of access attempts is already reached, it remains reset (broken line) (c).

In the example given, the timing and process control 16 then carries out a programming of the counter, in which the counter reading is implemented (d). This can also take place by interaction of an external control with a non-illustrated internal control circuit. In the present example, this is accomplished by writing a logical 1 into a free storage cell of the counter area 19. After the completion of this writing operation WR, the counter content is checked in a further reading operation RD as to whether or not the free counter bit was actually written (e). During the read and write operations, the memory address must not be changed because otherwise the bit flip-flop 2 is reset again. As soon as a logical 0, which in this case means a written counter digit, is present and the third NOR gate 12 is released, the release flip-flop 3 is set and the release signal F is generated (f).

As soon as the release signal F is generated and is present at the input of the timing and process control 16, the timing and process control releases access to the user area 23. Subsequently, the address of the user area 23 can be connected (g).

If it is to be possible to reset the counter, a further release procedure must be carried out. This is accomplished in the manner described above with a further device which corresponds to the device I according to FIG. 1. With a connection of two such devices, a first release signal is first generated with a second secret code. As long as this first release signal has not been generated, a clearing operation of the timing and process control 16 with regard to the counting area 19 cannot be carried out.

The foregoing is a description corresponding in substance to German Application No. P 35 25 017.8, dated July 12, 1985, the International priority of which is being claimed for the instant application, and which is hereby made part of this application. Any material discrepancies between the foregoing specification and the aforementioned corresponding German application are to be resolved in favor of the latter.

I claim:

1. Apparatus for carrying-out a validation operation for a chip card with a user memory, comprising a code memory for storing reference data; a comparator having an input connected to said code memory for receiving said reference data, and an input for receiving externally entered data and an output; a first logical gate having an input connected to said output of said comparator, an input for receiving a respective control signal from an address of said code memory and an output; a control memory having an output; a second logical gate having an input connected to said output of said control memory, an input receiving a control signal from a corresponding address of said control memory and an output; a first bistable circuit having in input connected to said output of said first logical gate and an output; a second bistable circuit having an input connected to said output of said second logical gate and an output; and a third logical gate having inputs respectively connected to said outputs of said first and second bistable circuits and said output of said control memory.

2. Apparatus according to claim 1, wherein said logical gates are NOR gates, said first bistable circuit is a code flip-flop, and said second bistable circuit is a bit flip-flop.

* * * * *